July 31, 1956 F. V. ATKESON 2,756,545
AUTOMATIC GLASS CUTTING MACHINE
Filed Nov. 15, 1952
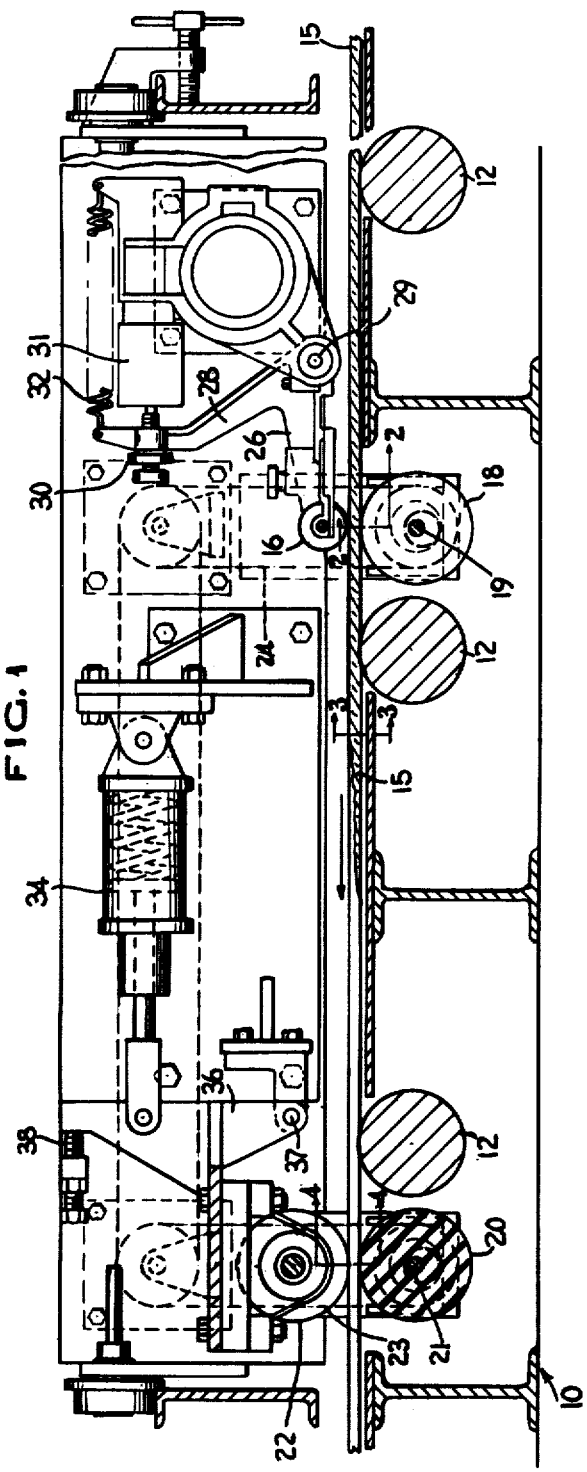
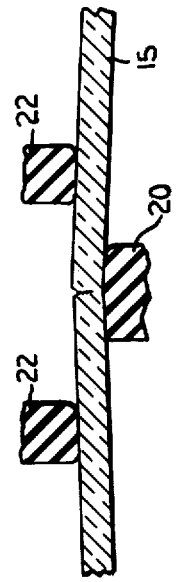
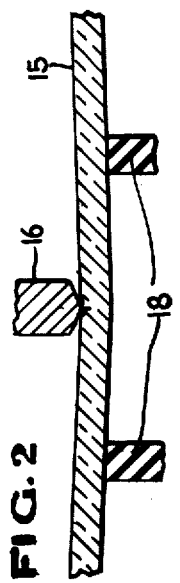
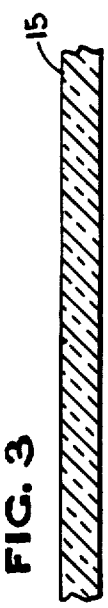
INVENTOR.
FLORIAN V. ATKESON
BY
Oscar L Spencer
ATTORNEY United States Patent Office 2,756,545
Patented July 31, 1956

2,756,545
AUTOMATIC GLASS CUTTING MACHINE

Florian V. Atkeson, Springdale, Pa., assignor to Pittsburgh Plate Glass Company, Allegheny County, Pa., a corporation of Pennsylvania Application November 15, 1952, Serial No. 320,798

11 Claims. (Cl. 49—48)

This invention relates to a glass cutting machine and particularly to one embodying an entirely new principle of glass cutting.

The usual method of cutting glass involves scoring a glass plate with a diamond or steel cutter and then breaking the plate by a tensioning moment usually applied at one end of the score line. This conventional method cannot produce a good cut unless the width of the strip cut off the main body of the plate is large compared with its thickness. In trimming edges from a glass plate, the rigidity to bending of the two parts to be separated is too different, and the break either does not follow the score line, or its edges become increasingly flared as the break moves away from the point of application of the tensioning moment.

It has been observed by glass cutters generally that when glass is scored by any of the usual means that the cut may be run or opened most easily if the tensioning or opening moment is applied as quickly as possible after the scoring action has taken place. If glass is scored and allowed to stand for any appreciable time, running of the cut will be found more difficult and in many cases impossible. The expression in the trade for such a condition is that the cut has "cooled off" or "healed." One of the main reasons for the use of oil on glass or a cutting wheel or both is to slow down such healing action. Delicate measurements have shown that healing action is an exponential function of time elapsed after scoring. A large healing factor takes place within the first few seconds after scoring. An elapsed time of five minutes can cause doubling of the opening moment required to run the cut. This results in a necessary increased tensioning of the glass to overcome the effects of the healing, thereby incurring various defects in the cut surfaces, such as shark teeth, flare and shatter shadow.

It is an object of the present invention to provide a device for mechanically cutting block sizes from sheets of either plate or window glass.

Another object of the present invention is to provide an automatic glass cutter capable of trimming edges from a sheet of glass having a width on the order of the thickness of the glass cut.

Still another object of the present invention is to eliminate present glass snapping methods and their attendant inefficiencies.

A further object of the present invention is to provide an apparatus which will run a cut produced by a glass cutter before appreciable healing takes place in the glass being cut.

Another object of the present invention is to provide on a mechanical conveyor a changing stress pattern in relation to the score line, such that the running fracture never overruns the cutting wheel, thereby providing a mechanically operated device that runs a cut shortly after the score line is produced on a surface of a glass sheet.

These and other objects of the present invention will become apparent upon further study of the following description of a typical embodiment of the present invention. It is to be understood however, that the scope of the present invention is to be limited only by the accompanying claims and not to the specific embodiment described in the specification, which description is contained merely for illustration purposes.

In the drawings:

Figure 1 represents a longitudinal sectional view of a schematic representation of a device embodying the features contained in the present invention;

Figure 2 is a cross-sectional view along the lines 2—2 of Figure 1 showing the effect of a compressive force applied to a glass sheet which is in the process of being scored;

Figure 3 is a cross-sectional view along the lines 3—3 of Figure 1, showing the glass sheet at a point between the application of the compressive force and the application of a tensioning moment where the glass is not subjected to either tension or compression;

Figure 4 is a cross-sectional view along the lines 4—4 of Figure 1, showing the effect of a tensioning moment applied to a glass sheet to open the cut produced during the scoring operation.

A glass conveyor 10 is provided with a plurality of driven rolls 12. The rolls 12 are driven in such a manner as to cause sheet glass to be conveyed in the direction of the arrow as shown in the drawing.

A glass cutting wheel which is preferably made of carbide rather than steel is rotatably connected to a wheel housing 16 and is brought to bear against one surface of the glass 15 to produce a score line as the glass is conveyed past the wheel and resilient spaced wheels 18 mounted on eccentric axles 19 are brought to bear on the opposite surface of the glass in alignment with the edge of the cutting wheel by a driving means (not shown) through chain drives 24 causing eccentric axles 19 to rotate, thereby lifting wheels 18. The opposing pressures from the cutter and the spaced wheels produce a compressive stress in the upper glass surface resulting in a negative opening moment.

The cutting wheel housing 16 is connected to a rocker arm 26 and the latter in turn to a moment arm 28. These arms are rotatable about an axle 29. A screw adjustment means 30 determines the lowermost position of the cutter 16. Pressure on the cutting wheel is regulated by air pressure in an actuating air cylinder 31. The pressure within air cylinder 31 causes the lever arm to be displaced forwardly thereby causing the cutter wheel to be lowered against the adjacent glass surface. A compression spring 32 is provided to retract the cutter from the adjacent glass surface whenever the forwardly directed pressure applied by actuating cylinder 31 to lever arm 28 is removed.

By opening the cut in a minimum of time after scoring, it has been found that pressure on the cutting wheel can be reduced to about 50% of the value required where longer elapsed times are allowed to intervene. By the above method, the time interval between opening and scoring has been reduced to between one-tenth to one-half second depending on the conveyor speed. Such reduction of pressure lengthens the life of the cutting wheel since its lifetime varies approximately inversely as the square of the applied pressure. Lower pressure also minimizes glass destruction at the score line giving cleaner cuts.

At some distance further along the path of glass travel there is positioned a hard rubber peaking roll 20. This peaking roll is aligned with the cutter along the longitudinal score line on the opposite side of the glass. On opposite sides of the hard rubber peaking roll 20 are a pair of tensioning rollers 22 disposed on the opposite side of the glass sheet 15. This peaking roll provides a fulcrum for application of an opening moment by pressure applied to the sheet glass 15 by tensioning rollers 22 disposed on opposite sides of the longitudinal score line. The peaking roll 20 may be raised or lowered by rotation of an eccentric axle 21 by means of a chain drive 23 connected to a suitable driving means (not shown).

Tensioning members 22 are forced against the adjacent glass surfaces by means of a compressed air mechanism 34 which is coupled to the tensioning members by a rocker arm 36. Rocker arm 36 rotates about a stub axle 37 when pressure from mechanism 34 is applied, thereby forcing members 22 against the upper surface of the glass. An adjustable screw 38 is provided to limit the amount of lowering of tensioning members 22.

As the sheet glass is conveyed along the conveyor line, the application of pressure by the cutting wheel 16 located in longitudinal alignment with resilient spaced wheels 18 scores the surface of the glass 15 passing the cutting edge of wheel 16 and causes the glass to assume a cross sectional shape such as shown in exaggerated form in Figure 2. As the glass passes between roller 20 and tensioning members 22, the tensioning pressure applied causes the cut formed by the cutter to open and the glass to assume the position shown in exaggerated form in Figure 4. In between the position shown in Figures 2 and 4 there is a position where no moment either of compression or tension is applied. Such a position is shown in Figure 3.

It is to be noted that the compressive force applied to the glass enables the opening of the cut to be limited to the position where the resultant force applied begins to change from a compressive force to a tensioning force. In other words, the position of the cut opening is to the left of the position of no moment as seen in the view of Figure 3, whereas no opening can exist in the area of the glass that is under compression. The relative position of the first opening of the cut and the cutter and the tensioning members can be varied by varying the various pressures applied by the cutter and the tensioning members.

Glass cut with the present machine has stronger edges than glass cut by other means presently utilized because the time of healing the cut is reduced to a minimum. The strength of the edges obtained from the present cutting operation arises from the fact that the development of stress wings tending to cause spalling of the edges is minimized due to the short time between the cutting and opening operation. The development of the stress wing, like the healing effect, is dependent upon the time between the cutting and running operation, which time is kept to a minimum with the present device. In addition, as long as the glass is under compression, such as is obtained under the cutter wheel 16 in the cross sectional area shown in Figure 2, the tendency of the glass to heal is inhibited by the compressive forces.

Under present conventional methods, the development of stress wings is inhibited by oil placed upon the glass, but with the present invention the opening is done so quickly following the scoring operation, no oil is required because no appreciable healing results in the interim between scoring and opening due to the speed of travel of the glass between the cutter and the peaking roller.

Since it is unnecessary to use oil on the glass, a dry cut is obtained and there is no subsequent problem of removing oil which is present using the present day conventional cutting operation. In addition, the glass can be stacked and/or packaged and shipped immediately after cutting without waiting for the presently required oil removal operation to be performed.

As an example of the efficacy of the opening of the cut after the score is made, trials have shown comparable cutting action on polished plate glass, rough rolled plate glass and unannealed and annealed window glass. Glass sheets have been run through this machine at rates varying from 14 to 86 feet per minute without any appreciable difference in the quality of the cuts obtained.

A novel concept in the art of cutting glass has been demonstrated. This concept involves applying a compressive bending force to a sheet of glass during the cutting operation and then rapidly but gradually reversing the nature of the force to a tension or opening force thereby running the cut. The running of the cut is not allowed to overrun the cutter wheel, because it has been demonstrated that the cut does not run beyond the point of zero stress. In other words, the cut begins to be run at the point where the compressive force applied in the vicinity of the cutter is changed into a tension force on the glass tending to separate the plurality of sections that are to be cut.

While the exact location of the cutter wheel, peaking rollers and tensioning members have been shown for a specific embodiment, it is understood that various modifications of the present invention may be made without departing from the spirit of the invention. For example, the peaking roller 20 may be moved closer to the cutter than are the tensioning members 22. In addition, a plurality of cutters and peaking rollers and tensioning members may be simultaneously utilized on the same cutting machine to cut a glass sheet into a plurality of strips of a desired number greater than two.

Also another embodiment of the principle has been made to combine cross cutting means to complete the mechanical process of cutting a plurality of block sizes from a larger sheet. As an example, a sheet of window glass which has had edges stripped to finish 84 inches wide and capped (cross cut) to 80 inches long will give 24 factory lights 14 x 20 inches.

Machines have been designed using the described double flexure method to provide the following actions:

1. Edge stripping-plate glass rough rolled, window glass, polished plate glass.
2. Block or "cord wood" size cutting plate and window glass.
3. Circle cutting.
4. Pattern cutting (for example windshields and back lights for automobiles).

What is claimed is:

1. A method of cutting a continuous sheet of glass comprising the steps of placing the glass surface to be cut under compression, scoring the compressed glass surface and simultaneously applying tension forces to said surface at a point spaced from the point of scoring thereby running the cut formed along the glass surface.

2. A method of cutting a continuous sheet of moving glass comprising locally compressing a surface of a glass sheet to be cut, scoring the compressed surface of the glass sheet longitudinally in the zone of compression, and simultaneously applying to said surface at a point spaced from the point of scoring a tensioning moment about the longitudinal score line of the glass.

3. A device for cutting a continuous sheet of moving glass comprising a conveyor for conveying glass in sheet form, cutting means movable into cutting engagement with one surface of the glass, at least one member adapted for pressure engaging relation with the opposite surface of the glass, fulcrum means aligned with and spaced from the cutter means along the direction of travel of the glass for pressure engagement with the opposite surface of the glass conveyed, at least one tensioning member movable into pressure engagement with the one surface of the glass at one side of the axis formed by the cutting means and the fulcrum means.

4. A device for cutting a continuous sheet of moving glass comprising a conveyor for conveying glass in sheet form, cutting means movable into cutting engagement with one surface of the glass, means for bringing the cutting means into cutting engagement with the one surface of the glass, compressing means adapted for pressure engaging relation with the opposite surface of the glass, fulcrum means aligned with and spaced from the cutter means along the direction of travel of the glass for pressure engagement with the opposite surface of the glass conveyed, at least one tensioning member adapted for pressure engagement with the one surface of the glass at one side of the axis formed by the cutting means and the fulcrum means.

5. A device for cutting a continuous sheet of moving glass comprising a conveyor for conveying glass in sheet form, cutting means movable into cutting engagement with one surface of the glass, means for bringing the cutting means into engagement with the one surface of the glass, means for limiting the pressure between the cutting means and the one glass surface, compressing means adapted for pressure-engaging relation with the opposite surface of the glass, fulcrum means aligned with and spaced from the cutter means along the direction of travel of the glass for pressure engagement with the other surface of the glass conveyed, at least one tensioning member adapted for pressure engagement with the one surface of the glass at one side of the axis formed by the cutting means and the fulcrum means.

6. A device for cutting glass comprising a conveyor for horizontally conveying glass in sheet form, cutting means movable into cutting engagement with the upper surface of the glass, a pair of rollers adapted for pressure engagement with the under surface of the glass so located with respect to the location of the cutting means as to provide a pair of compressive moments causing the upper surface of the glass to be in compression when the glass is passed beneath the cutting means to produce a score line on its upper surface, tensioning means comprising a peaked roller and a pair of tensioning members, said peaked roller being spaced longitudinally from the cutting means a distance less than the length of the glass sheet to be cut and located for pressure engagement with the under surface of the glass in alignment with the score line and said pair of tensioning members being movable into pressure engagement against the upper surface of the glass and located with respect to the location of the peaked roller to cause a pair of oppositely disposed tensioning moments about the peaked roller at a distance from the cutting means, thereby opening the score formed by the cutting means as the glass sheet is conveyed past the peaked roller.

7. A method of mechanically cutting a continuous sheet of moving glass comprising the step of flexing the glass so as to have the glass form a modified V in cross-section, scoring a surface of the glass at the bottom of the groove of the V, and reversing the flexure of the glass in such manner that the glass cut is caused to run at a predetermined distance behind the point of scoring.

8. A method of mechanically cutting a continuous sheet of moving glass on a conveyor comprising the step of flexing the glass on one portion of the conveyor so as to have the glass form a modified V in cross section, scoring a surface of the glass at the bottom of the groove of the V, and reversing the flexure of the glass at another portion of the conveyor in such manner that the glass cut is caused to run at a predetermined distance behind the point of scoring.

9. A method of cutting a moving glass sheet comprising the steps of scoring a surface of the glass, placing the glass surface in compression as it passes the place of scoring, maintaining the compressive force in the scored glass surface to prevent the cut opening from overrunning the point of application of the score, applying tensioning forces to open the score cut in the surface of the glass sheet after it has advanced from the place of scoring.

10. A method of cutting a continuous moving glass sheet comprising locally compressing a surface of the sheet at its leading edge, scoring the compressed surface of the sheet to define a cutting line on the moving sheet, maintaining the scored surface in compression to prevent the score line from overrunning its point of application, and applying a tensioning moment about the score line of the sheet after the sheet passes the place of scoring in order to open the cut in the area of tensioning.

11. Apparatus for cutting a continuous moving glass sheet comprising a conveyor for moving the sheet longitudinally, means disposed in the path of the leading edge of the moving sheet for imposing a compressive force upon the upper surface of the moving sheet, means for scoring the sheet in its compressed area, and means spaced from the scoring means for engaging the moving sheet and imposing a tensioning force upon the scored surface before the trailing edge of the sheet passes the scoring means.

References Cited in the file of this patent
UNITED STATES PATENTS

| | | |
|---|---|---|
| 2,078,386 | Kendis | Apr. 27, 1937 |
| 2,504,655 | Dallas | Apr. 18, 1950 |

Dedication 2,756,545.—*Florian V. Atkeson*, Springdale, Pa. AUTOMATIC GLASS CUTTING MACHINE. Patent dated July 31, 1956. Dedication filed July 25, 1973, by the assignee, *PPG Industries, Inc.*

Hereby dedicates for the remainder of its term to the free use and benefit of the People of the United States.

[*Official Gazette January 8, 1974.*]